3,572,154
DIFFERENTIAL ASSEMBLY
Gerald P. Bartolomucci, Brooklyn, Mich., assignor to Clark Equipment Company
Filed May 27, 1969, Ser. No. 828,181
Int. Cl. F16h 1/14, 35/08
U.S. Cl. 74—424     5 Claims

ABSTRACT OF THE DISCLOSURE

A motor and differential assembly combination in which the motor shaft is separable from the differential input gear. The input gear is journaled in a support which is connected to the differential housing and positions the input gear for proper mesh with the differential ring gear.

BACKGROUND OF THE INVENTION

The field of art to which this invention pertains includes machine elements and mechanisms, and more specifically adjustable gearing.

Electric motors are sometimes used in combination with a differential. In such cases it has been the practice to have the differential input gear integral with the motor shaft. This has many disadvantages. For example, if it is necessary to remove or disassemble the motor, the differential must be disassembled also. During reassembly it will be necessary to carefully position the input gear to assure proper mesh with the differential ring gear. This is time consuming and so involves added maintenance expense. Further, the pinion gear and the ring gear are spiral bevel gears, and so are manufactured as "matched sets" in order to insure a low noise level and a long life cycle. If one of the gears of a "matched set" is replaced with another, then the set will be noisy and have a very much reduced life cycle. Consequently, if the motor has to be replaced it is necessary also to replace the ring gear in order to maintain a "matched set" of pinion and ring gears, regardless of the condition of either or both gears.

Therefore, it is a principal object of my invention to provide a differential assembly which is easy and economical to maintain.

SUMMARY OF THE INVENTION

In carrying out my invention in a preferred embodiment, I provide an axle housing with an opening therein. The housing has disposed therein a differential with a ring gear. Located in the opening and connected to the housing is a support in which a pinion gear is journaled for rotation. The pinion gear is positioned for proper mesh with the ring gear by cooperation of the support with the opening and shim means which cooperate with the means for connecting the support to the housing.

The above and other objects, features and advantages of my invention will be more readily understood when the detailed description is taken in conjunction with the drawing.

DESCRIPTION OF THE PREFERRED EMBODIMENT

Figure 1:
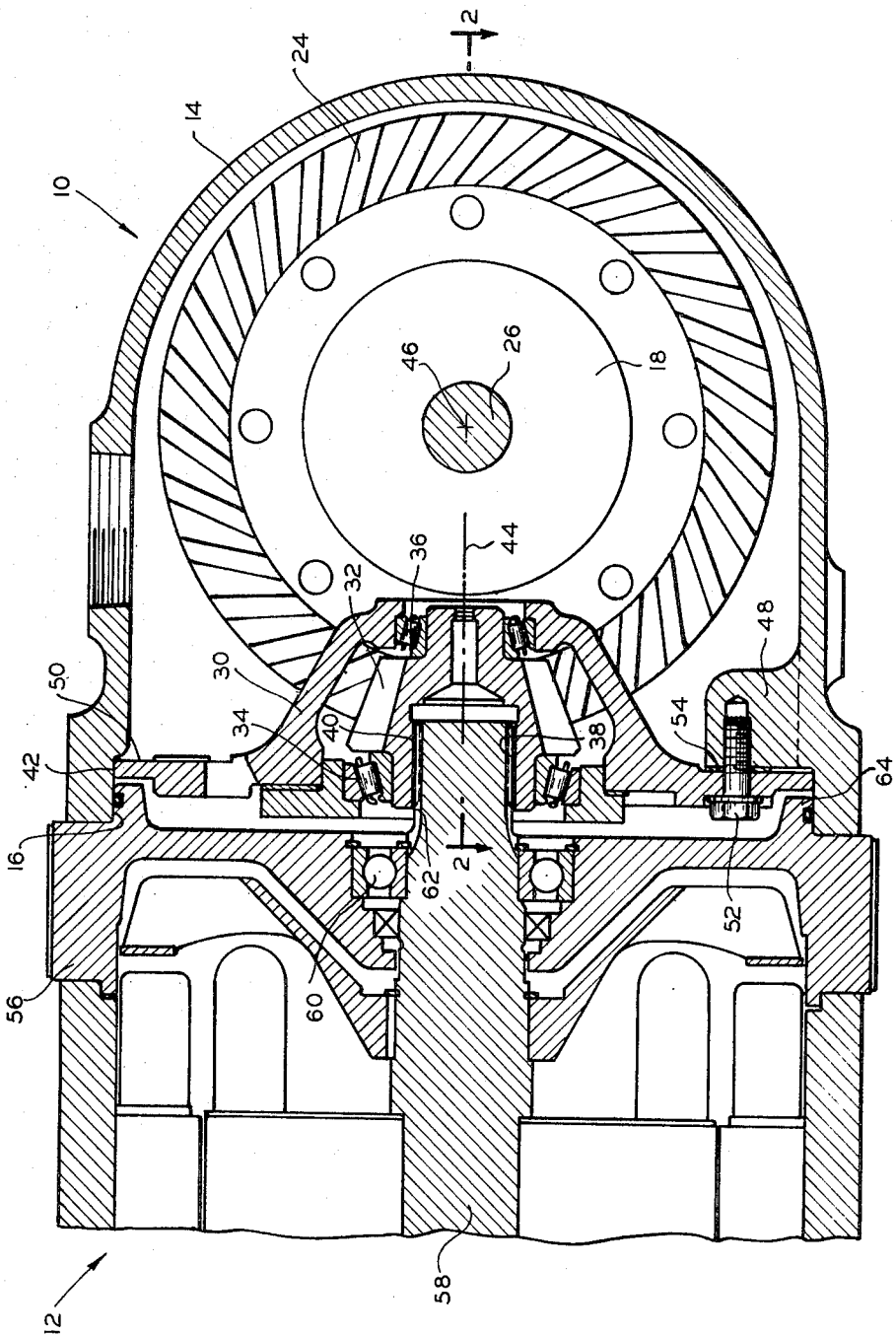
FIG. 1 is a fragmentary cross-section of a motor and differential assembly combination showing to advantage my invention.
Figure 2:
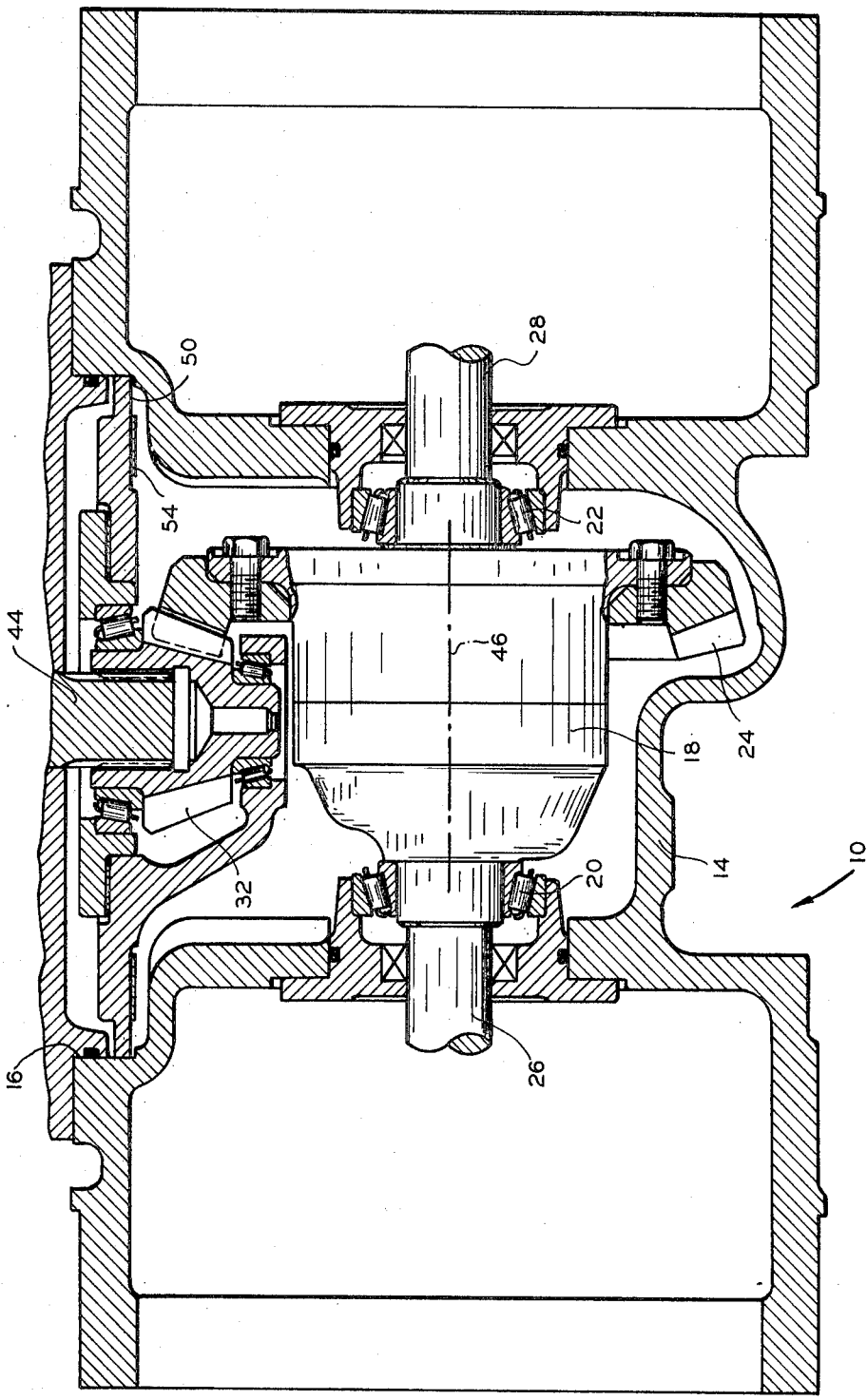
FIG. 2 is a section taken along line 2—2 of FIG. 1.

Referring now to the drawing, reference numeral 10 denotes generally a differential assembly which is adapted to have an electric motor 12 connected thereto.

Differential assembly 10 includes an axle housing 14 with an annular opening 16 therein. Disposed in housing 14 is a conventional differential 18 which is journaled for rotation in a pair of bearings 20 and 22. Connected to differential 18 is a spiral bevel ring gear 24 and a pair of axle shafts 26 and 28. Differential assembly 10 also includes a gear support 30 in which a spiral bevel pinion gear 32 is journaled for rotation at each end thereof by means of bearings 34 and 36. Pinion gear 32 includes a longitudinally extending bore 38 therein into which internal splines 40 are cut.

The outer perimeter 42 of support 30 cooperates with opening 16 so that the axis 44 of rotation of pinion gear 32 intersects the axis 46 of rotation of ring gear 24. Also, a plurality of shoulders 48 which are integral with housing 14 cooperate with the surface 50 of support 30 to position pinion gear 32 so that axis 44 of pinion gear 32 is perpendicular to axis 46 of ring gear 24. Support 30 is connected to housing 14 by means of a plurality of machine screws 52 which threadably engage shoulders 48. At this point it will be clear that housing 14, differential 18 and support 30 form a unitary assembly.

In order to position pinion gear 32 radially relative to ring gear 24 a shim 54 of appropriate thickness is disposed between surface 50 of support 30 and shoulders 48. It will now be apparent that pinion gear 32 may be disposed in proper mesh with ring gear 24 simply by disposing a shim 54 of the proper thickness between surface 50 and shoulders 48 and tightening machine screws 52.

Electric motor 12 includes a housing 56 in which a shaft 58 is journaled for rotation and supported adjacent one end thereof by a bearing 60. Shaft 58 has external splines 62 on one end thereof which cooperate with splines 40 to connect shaft 58 and pinion gear 32 for conjoint rotation when the one end of shaft 58 is disposed in bore 38 of pinion gear 32. There is a sliding fit between splines 40 and 62. The end of motor housing 56 also includes a lip 64 which cooperates with opening 16 of differential assembly housing 14 so that motor shaft 58 is disposed coaxially with the axis 44 of rotation of pinion gear 32. It will now be apparent that the distance which shaft 58 extends into bore 38 of pinion gear 32, within limits, is not critical and that proper positioning of shaft 58 relative to pinion gear 32 is greatly facilitated through the cooperation of lip 64 with opening 16. It also will be apparent at this point that motor 12 may be disassembled from and reassembled to differential assembly 10 without disturbing the mesh of pinion gear 32 with ring gear 24.

While only a single preferred embodiment of my invention has been described in detail, it will be understood that such description is intended to be illustrative only, and that various modifications and changes can be made to my invention without departing from the spirit and scope of it.

What is claimed is:

1. For use with a motor having a shaft, a differential assembly comprising an axle housing, an opening in the said housing, a differential disposed in the said housing, the said differential including a ring gear, a separate gear support disposed in the said opening, an input gear journaled for rotation in the said support and disposed to mesh with the said ring gear, means for adjusting the position of the said input gear radially relative to the said ring gear to provide proper mesh between the said two gears, the said opening and the said support cooperating with each other to position the said input gear relative to the said ring gear in at least one other respect, and means for connecting the said support to the said housing to form a unitary assembly.

2. A differential assembly as set forth in claim 1 wherein the said input gear includes a bore which is adapted to slidably and telescopically receive one end of the shaft and means for drivingly connecting the shaft to the said input gear.

3. A differential assembly as set forth in claim 2 wherein the said opening cooperates with the motor to position the shaft coaxially with the said bore.

4. A differential assembly as set forth in claim 3 wherein the said input gear is journaled for rotation at both ends thereof.

5. A differential assembly as set forth in claim 4 wherein the said connecting means includes cooperating splines on the shaft and in the said bore.

References Cited

UNITED STATES PATENTS

| | | | |
|---|---|---|---|
| 3,030,825 | 4/1962 | Diedrich et al. | 74—424X |
| 2,788,674 | 4/1957 | Dennys | 74—400 |
| 2,787,915 | 4/1957 | Holton | 74—424 |
| 2,378,589 | 6/1945 | Slack et al. | 74—424X |

LEONARD H. GERIN, Primary Examiner

U.S. Cl. X.R.

74—400, 417, 423